United States Patent [19]
Ellestad

[11] Patent Number: 5,934,007
[45] Date of Patent: Aug. 10, 1999

[54] FISHING LURE SYSTEM

[76] Inventor: Tim Ellestad, 14141 — 101st St. SE, Havana, N. Dak. 58043-9713

[21] Appl. No.: 09/167,341

[22] Filed: Oct. 7, 1998

[51] Int. Cl.⁶ ................................................. A01K 85/14
[52] U.S. Cl. ........................................... 43/42.06; 43/42.5
[58] Field of Search ........................ 43/42, 42.06, 42.35, 43/42.5; D22/125, 126, 129–133

[56] References Cited

U.S. PATENT DOCUMENTS

| | | | |
|---|---|---|---|
| D. 225,324 | 12/1972 | Royal | D22/126 |
| D. 357,052 | 4/1995 | Walker | D22/126 |
| 1,078,886 | 11/1913 | Weller | 43/42.06 |
| 1,585,943 | 5/1926 | Streich | D22/129 |
| 1,611,644 | 12/1926 | Johnson | 43/42.06 |
| 1,710,908 | 4/1929 | Vereecken | 43/42.35 |
| 2,229,239 | 1/1941 | Davis | 43/42.06 |
| 2,476,388 | 7/1949 | Schafer | 43/42.06 |
| 2,575,430 | 11/1951 | Shockey | 43/42.06 |
| 2,600,437 | 6/1952 | Siepe | D22/126 |
| 2,610,428 | 9/1952 | Jones | D22/126 |
| 2,659,995 | 11/1953 | Hagstrom | 43/42.06 |
| 2,731,755 | 1/1956 | Ward et al. | D22/126 |
| 2,736,124 | 2/1956 | Wittman, Jr. | D22/132 |
| 2,791,057 | 5/1957 | Memoli | 43/42.06 |
| 2,797,518 | 7/1957 | Anderson | 43/42.06 |
| 2,817,180 | 12/1957 | Thomas | 43/42.06 |
| 2,846,805 | 8/1958 | Waitzman | 43/42.06 |
| 2,922,245 | 1/1960 | Sandburg | 43/42.06 |
| 2,952,092 | 9/1960 | Swenson | 43/42.06 |
| 3,041,772 | 7/1962 | Laszlo | 43/42.06 |
| 3,063,187 | 11/1962 | Abdelmaseh | 43/42.06 |
| 3,226,874 | 1/1966 | Boyd | 43/42.06 |
| 3,440,756 | 4/1969 | Leadbetter | 43/42.06 |
| 3,650,062 | 3/1972 | Troyer | 43/42.06 |
| 3,769,739 | 11/1973 | Pitts | 43/42.35 |
| 3,895,455 | 7/1975 | Johnston | D22/126 |
| 3,921,328 | 11/1975 | Holcombe | 43/42.06 |
| 3,973,351 | 8/1976 | Doiron | 43/42.06 |
| 4,069,609 | 1/1978 | Demy | 43/42.06 |
| 4,231,179 | 11/1980 | Hillesland | 43/42.06 |
| 4,648,198 | 3/1987 | Sauve | 43/42.06 |
| 4,835,897 | 6/1989 | Rudolph | 43/42.06 |
| 4,870,776 | 10/1989 | Shock | 43/42.06 |
| 5,611,168 | 3/1997 | Schultz et al. | D22/126 |

FOREIGN PATENT DOCUMENTS

| 1424070 | 11/1965 | France | 43/42.06 |
|---|---|---|---|

*Primary Examiner*—Michael J. Carone
*Assistant Examiner*—Darren Ark

[57] ABSTRACT

A fishing lure system for improving the movement of a fishing lure thereby increasing the probability of attracting fish to the fishing lure. The inventive device includes a body having a front loop and a fin attached to the body following the front loop. The front loop has a lumen that captures and guides the body through the water. The design increases the probability of rotation of the body during vertical and horizontal movement of the body within the water. The fin assists in the movement of the body and also reduces the velocity of the body during descent. In an alternative embodiment, a guide member is utilized to further increase the guidance of the body within the water.

1 Claim, 2 Drawing Sheets

FISHING LURE SYSTEM

BACKGROUND OF THE INVENTION

1. Field of the Invention

The present invention relates generally to fishing lures and more specifically it relates to a fishing lure system for improving the movement of a fishing lure thereby increasing the probability of attracting fish to the fishing lure.

2. Description of the Prior Art

Fishing lures have been in use for years. Typically, the lure will include a pan shaped lure or a lure that simulates the appearance of a common food source.

Conventional fishing lures tend to be reliant upon the fisherman for movement. If the fisherman is trolling with the conventional fishing lure attached to the fishing line, the lure will typically only spin with little horizontal or vertical movement. Further, a conventional pan shaped lure will descend straight down or at an angle if allowed to move freely within the water, especially during ice fishing. This does not provide life-like movements of the fishing lure and can be hard to catch for the fish. Additionally, the straight movements of a conventional fishing lure are not extremely attractive for a fish since there is little flashing or movement of the lure which attracts fish.

While these devices may be suitable for the particular purpose to which they address, they are not as suitable for improving the movement of a fishing lure thereby increasing the probability of attracting fish to the fishing lure. Conventional fishing lures are limited in their horizontal or vertical movement. If a conventional fishing lure is allowed to descend rapidly, it typically makes a straight path downwards or at an angle without allowing the fish to be enticed by it or catch it.

In these respects, the fishing lure system according to the present invention substantially departs from the conventional concepts and designs of the prior art, and in so doing provides an apparatus primarily developed for the purpose of improving the movement of a fishing lure thereby increasing the probability of attracting fish to the fishing lure.

SUMMARY OF THE INVENTION

A primary object of the present invention is to provide a fishing lure system that will overcome the shortcomings of the prior art devices.

Another object is to provide a fishing lure system that increases the vertical movement of the fishing lure during trolling or ice fishing.

An additional object is to provide a fishing lure system that increases the horizontal movement of the fishing lure during trolling or ice fishing.

A further object is to provide a fishing lure system that reduces the velocity the fishing lure while the fishing lure is descending while increasing the movement.

Another object is to provide a fishing lure system that is adaptable to various shapes of fishing lures.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

A fishing lure system for improving the movement of a fishing lure thereby increasing the probability of attracting fish to the fishing lure. The inventive device includes a body having a front loop and a fin attached to the body following the front loop. The front loop has a lumen that captures and guides the body through the water. The design increases the probability of rotation of the body during vertical and horizontal movement of the body within the water. The fin assists in the movement of the body and also reduces the velocity of the body during descent. In an alternative embodiment, a guide member is utilized to further increase the guidance of the body within the water.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
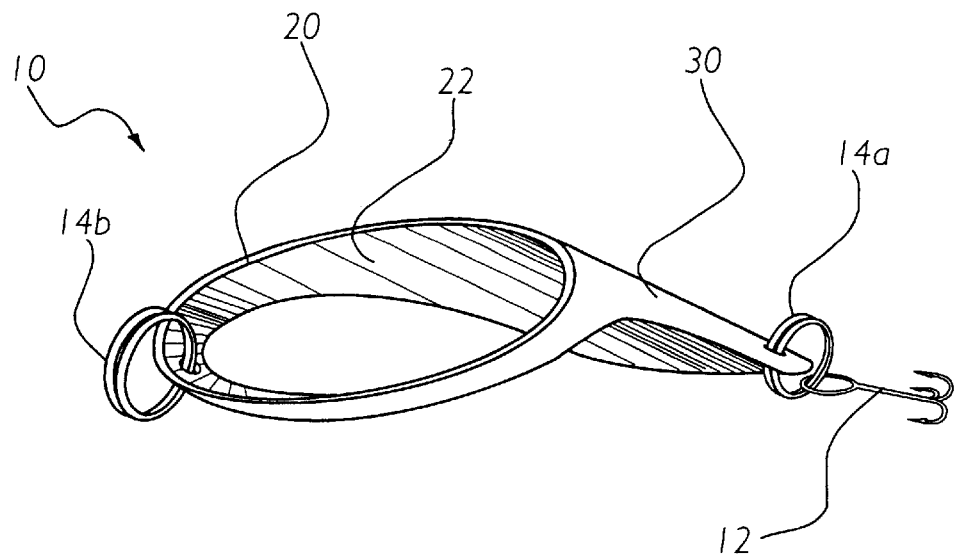
FIG. 1 is an upper perspective view of the present invention.

Turning now descriptively to the drawings, in which similar reference characters denote similar elements throughout the several view, FIGS. 1 through 4 illustrate a fishing lure system 10, which comprises a body having a front loop 20 and a fin 30 attached to the body following the front loop 20. The front loop 20 has a lumen that captures and guides the body through the water. The design increases the probability of rotation of the body during vertical and horizontal movement of the body within the water. The fin 30 assists in the movement of the body and also reduces the velocity of the body during descent. In an alternative embodiment, a guide member 40 is utilized to further increase the guidance of the body within the water.

As shown in FIG. 1 of the drawings, the preferred embodiment includes a front loop 20 having a lumen and a fin 30 attached to a rear portion of the front loop 20. A ring 14b is attached to the front loop 20 for receiving a leader or a fishing line directly. Another ring 14a is attached to the fin 30 and pivotally retains a hook 12. The hook 12 may have various designs as can be appreciated by one skilled in the art.

Figure 2:
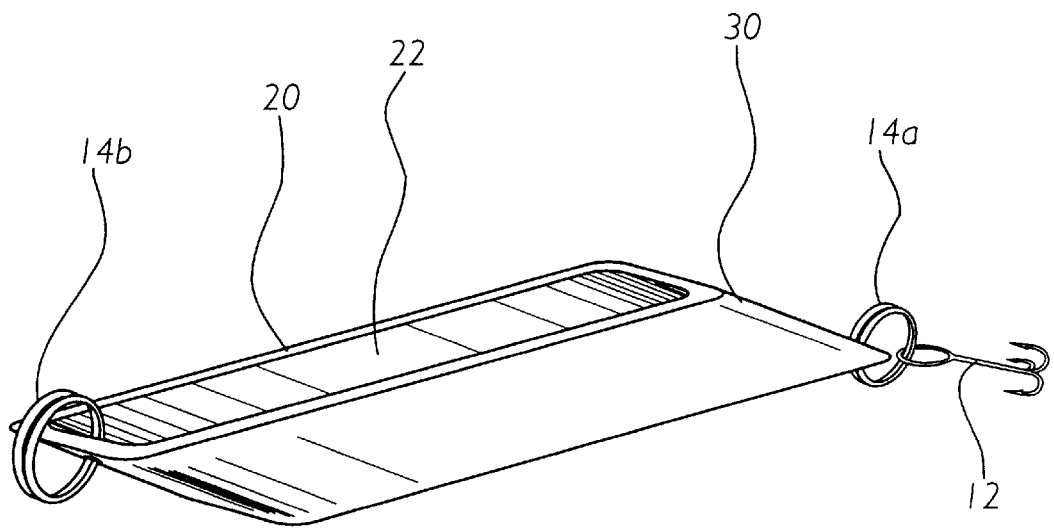
FIG. 2 is an upper perspective view of a second embodiment of the present invention.

The front loop 20 is preferably circular or oval shaped as shown in FIG. 1 of the drawings. However, as shown in FIG. 2 of the drawings, the front loop 20 may have a square or rectangular shape thereto, thereby creating a different action of the fishing lure within the water.

Figure 3:
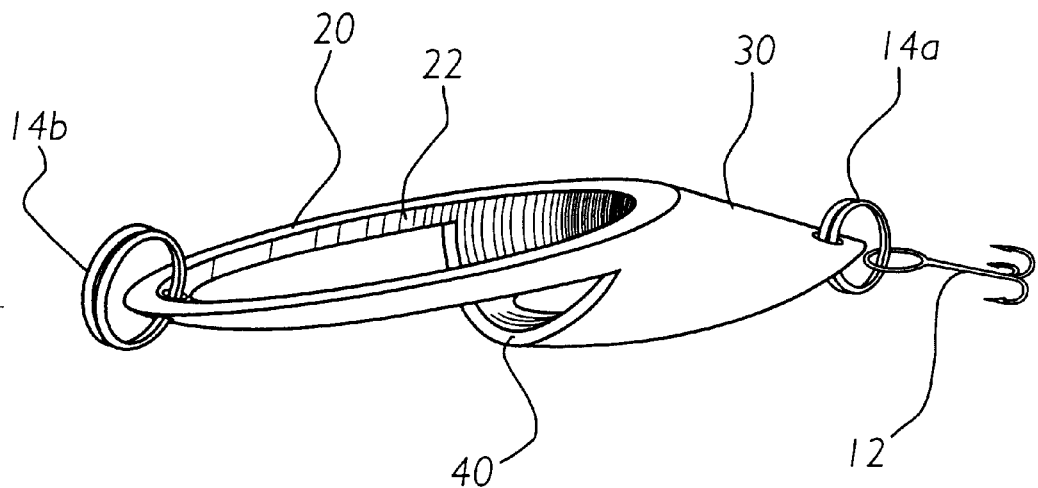
FIG. 3 is an upper perspective view of a third embodiment of the present invention.

As shown in FIG. 3 of the drawings, a guide member 40 is attached substantially orthogonal to the front loop 20 adjacent the fin 30. The guide member 40 provides additional guidance and action within the water for the fishing lure that attracts fish.

Figure 4:
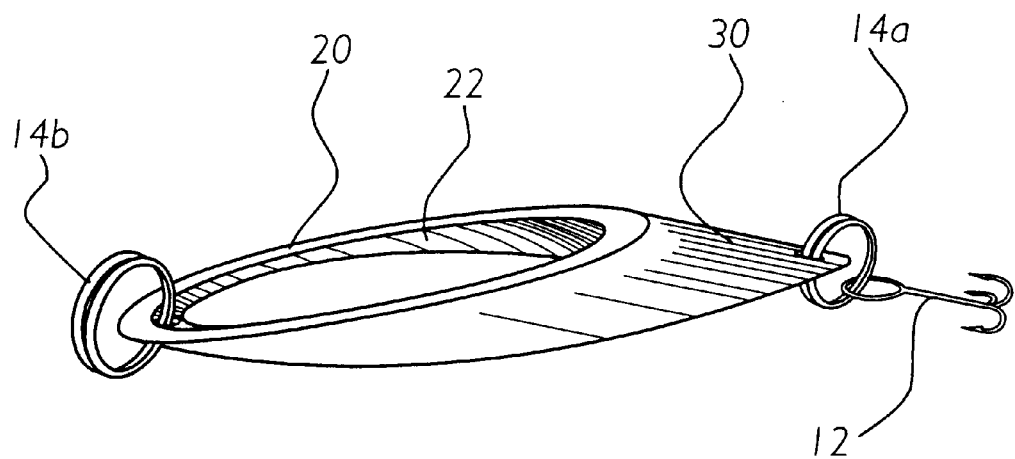
FIG. 4 is an upper perspective view of a fourth embodiment of the present invention.

As shown in FIG. 4 of the drawings, the sidewalls of the front loop 20 are broader providing further guidance of the water through the lumen of the front loop 20. The fin 30 is also shorter in length providing a less stable fishing lure in the water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing lure, comprising:

a front loop lying in a horizontal plane and having a front portion and a rear portion, wherein said front loop guides a fishing lure through water increasing the vertical and the horizontal movement of said fishing lure;

said front loop having an axis extending in a vertical direction which is perpendicular to the horizontal plane;

a semi-circular shaped guide member which is attached to a lower edge of said front loop at a position intermediate said front and rear portions and extends downwardly from said front loop in a direction which is perpendicular to said front loop;

a curved fin attached to an upper edge of said rear portion of said front loop, wherein said curved fin extends rearwardly and downwardly from said rear portion of the front loop, said curved fin having a convex outer surface with an apex which extends along a longitudinal axis of said fishing lure;

a first ring attached to said front portion of said front loop;

a second ring attached to said fin opposite of said first ring;

at least one hook attached to said second ring; and said guide element and said curved fin have respective rear edges, wherein there is an opening defined there between.

* * * * *